(12) United States Patent
Scott et al.

(10) Patent No.: US 7,907,474 B2
(45) Date of Patent: Mar. 15, 2011

(54) SUPERHETERODYNE SEISMIC VIBRATOR AND METHOD

(75) Inventors: Gary Lee Scott, Richmond, TX (US); William B. Pramik, Katy, TX (US)

(73) Assignee: Geokinetics Acquisition Company, Houston, TX (US)

( * ) Notice: Subject to any disclaimer, the term of this patent is extended or adjusted under 35 U.S.C. 154(b) by 573 days.

(21) Appl. No.: 11/906,347

(22) Filed: Oct. 2, 2007

(65) Prior Publication Data

US 2009/0086574 A1 Apr. 2, 2009

(51) Int. Cl.
*G01V 1/155* (2006.01)
(52) U.S. Cl. ......................................... 367/32; 367/189
(58) Field of Classification Search ................ 367/32, 367/25, 189
See application file for complete search history.

(56) References Cited

U.S. PATENT DOCUMENTS

| | | |
|---|---|---|
| 3,302,745 A | 2/1967 | Ikrath |
| 3,612,211 A | 10/1971 | Clark, III |
| 3,622,958 A | 11/1971 | Tucker et al. |
| 3,786,405 A | 1/1974 | Chramiec et al. |
| 3,863,202 A | 1/1975 | Landrum, Jr. |
| 3,964,013 A | 6/1976 | Konrad |
| 4,233,843 A | 11/1980 | Thompson et al. |
| 4,395,777 A | 7/1983 | Oki et al. |
| 5,361,407 A | 11/1994 | Sawada et al. |
| 5,521,882 A * | 5/1996 | D'Angelo et al. ............. 367/32 |
| 5,875,389 A | 2/1999 | Yokoyama |
| 7,301,852 B2 * | 11/2007 | Leggett et al. .................. 367/32 |
| 7,319,639 B2 | 1/2008 | Heyman |
| 2002/0134612 A1 | 9/2002 | Khan |
| 2005/0036406 A1 * | 2/2005 | Chen .......................... 369/30.12 |
| 2008/0130409 A1 * | 6/2008 | Leggett, III et al. ............ 367/35 |

FOREIGN PATENT DOCUMENTS

| | | |
|---|---|---|
| GB | 2404983 | 2/2005 |
| WO | WO 02/04985 | 1/2002 |

OTHER PUBLICATIONS

Amanda Mason, United Kingdom Novelty Search Report, Nov. 12, 2008.

* cited by examiner

*Primary Examiner* — Mark Hellner
(74) *Attorney, Agent, or Firm* — Karen B. Tripp

(57) ABSTRACT

A seismic energy source includes at least a first and a second acoustic radiator operatively coupled to a non-linear medium proximate an upper limit of formations in the Earth's subsurface. The first and second acoustic radiators are configured to convert electrical energy directly into acoustic energy. The source includes means for operating the first and the second acoustic radiator at respective first and second frequencies. The first and second frequencies are selected such that substantially no acoustic energy propagates through the non-linear medium. The first and the second frequencies are selected such that a difference therebetween is swept through a range of frequencies of seismic energy capable of propagating through the Earth's subsurface to at least one acoustic impedance boundary within the Earth's subsurface.

20 Claims, 1 Drawing Sheet

SUPERHETERODYNE SEISMIC VIBRATOR AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of vibrators used as sources of seismic energy for surveying the Earth's subsurface. More particularly, the invention relates to vibrators that use the superheterodyne principle to produce very low frequency seismic energy.

2. Background Art

Vibrator-type seismic energy sources known in the art impart seismic energy into the Earth's subsurface by moving a radiating surface in a particular manner. See, for example, U.S. Pat. No. 3,863,202 issued to Landrum, Jr. In one type of implementation, the radiating surface is coupled to a control system including a hydraulic ram and a control valve that selectively applies hydraulic pressure to each side of the hydraulic ram. The control valve is typically electrically operated. Electrical signals applied to the control valve generally correspond to the vibratory waveform that it is intended to be produced by the motion of the radiating surface. In order for the motion of the radiating surface to be efficiently coupled to the Earth, it is necessary to provide a large reactive mass coupled to the hydraulic ram opposite the radiating surface. In another implementation, a diaphragm placed in a body of water is moved in a similar manner through either electrical or electro-mechanical means.

A particular limitation to vibrator seismic sources known in the art relates to generating low frequency seismic energy, typically less than about 8 Hz. For such low frequencies, the reactive mass or diaphragm must be relatively large, and the amount of motion that must be imparted to the radiating surface is also relatively large. Controlling such motion so that it faithfully corresponds to the electrical control signal has also proven to be difficult. Additionally, vibrators known in the art are limited with respect to the highest frequencies they can accurately generate because of coupling difficulties between the driver and the acoustic radiating the surface and limitations in the speed at which hydraulic mechanism can react. Typically, conventional vibrators cannot operate effectively above about 150 Hz. There continues to be a need for improved vibrator-type seismic energy sources for subsurface seismic surveying.

SUMMARY OF THE INVENTION

A seismic energy source according to one aspect of the invention includes at least a first and a second acoustic radiator operatively coupled to a non-linear medium proximate an upper limit of formations in the Earth's subsurface. The first and second acoustic radiators are configured to convert electrical energy directly into acoustic energy. The source includes means for operating the first and the second acoustic radiator at respective first and second frequencies. The first and second frequencies are selected such that substantially no acoustic energy propagates through the non-linear medium. The first and the second frequencies are selected such that a difference therebetween is swept through a range of frequencies of seismic energy capable of propagating through the Earth's subsurface to at least one acoustic impedance boundary within the Earth's subsurface. The seismic source is not limited to a maximum of two acoustic radiators and could consist of a plurality of radiators producing a plurality of different superheterodyne sweep patterns.

A method for subsurface surveying according to another aspect of the invention includes operating a first acoustic radiator disposed proximate the upper limit of the Earth's subsurface at a first frequency and operating a second acoustic radiator proximate the upper limit of the Earth's subsurface and the first acoustic radiator at a second frequency. The first and second frequencies are above a propagation frequency of a non-linear medium proximate the upper limit. A difference between the first and second frequencies is swept through a range of frequencies capable of propagating seismic energy through the Earth's subsurface to at least one acoustic impedance boundary therein.

Other aspects and advantages of the invention will be apparent from the following description and the appended claims.

DETAILED DESCRIPTION

Figure 1:
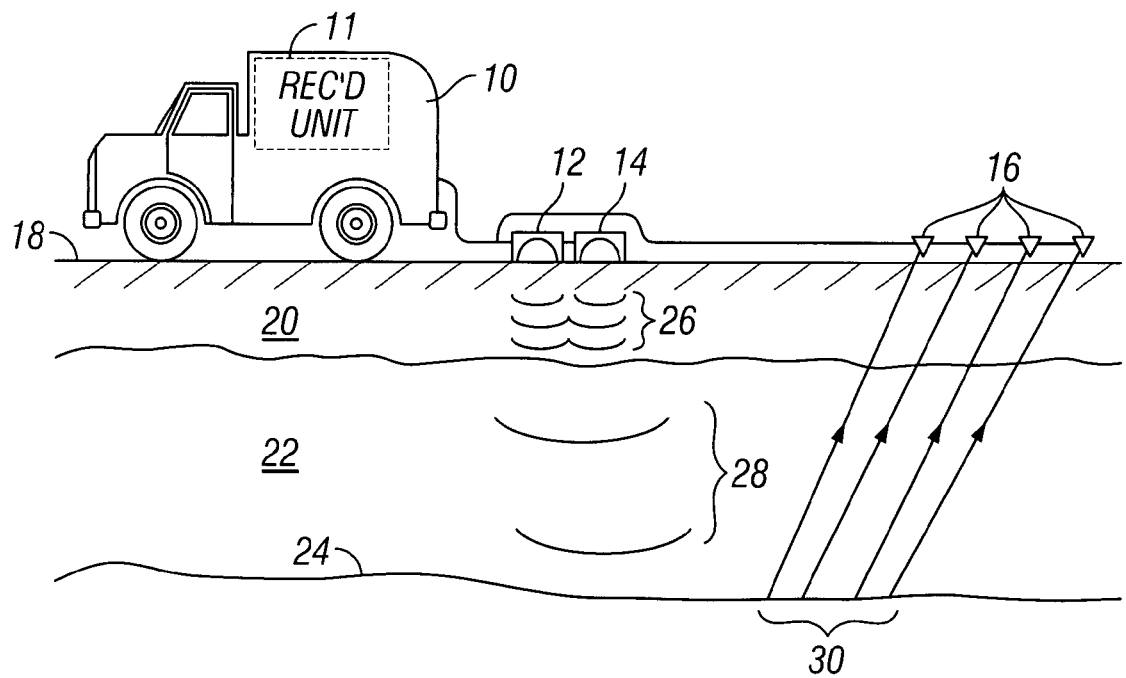
FIG. 1 shows one example of a seismic vibrator system.

An example seismic energy source and recording system in accordance with the invention is shown schematically in FIG. 1. A seismic recording unit 11, which in the present example is disposed in a truck 10 or similar vehicle, may include devices (none shown separately) for controlling one or more seismic energy sources which may be acoustic radiators 12, 14 (explained below), and for determining geodetic position of the recording unit 11 and associated devices, such as the seismic source and each of a plurality of seismic sensors 16. The recording unit 11 typically also includes a recording device (not shown separately) for recording signals produced by each of the seismic sensors 16 in response to seismic energy imparted into the Earth's subsurface. The truck 10, the acoustic radiators 12, 14 and the seismic sensors 16 are shown disposed on the ground surface 18 on dry land. Use of a method and system according to the invention is not limited to the example shown in FIG. 1 of seismic surveying on dry land. The invention is equally applicable in marine surveys, in which the seismic energy source and seismic sensors are towed in the water by one or more vessels, or in shallow water or "transition zone" surveys, in which either or both the seismic energy source and the seismic sensors are disposed on the bottom of a body of water. Accordingly, the land example shown in FIG. 1 is not a limit on the scope of this invention. Generally, the acoustic radiators 12, 14 are placed above or proximate the upper limit of the Earth's subsurface. Such upper limit may be defined for purposes of this description as the land surface or the water bottom in marine environments.

Below the Earth's surface 18, the subsurface formations typically include a zone 20 proximate the upper limit which responds non-linearly within the higher frequency ranges disclosed herein, and to the application of such elastic energy, for example seismic energy. Formations below the non-linear zone 20 may have different elastic properties, however the existence of the non-linear zone 20 is important to the operation of the invention and will be further explained below. One or more acoustic impedance boundaries 24 typically exist in the Earth's subsurface. Seismic energy imparted into the Earth's subsurface by the acoustic radiators 12, 14 propagates, as shown at 26, through the non-linear zone 20 in one manner, and then through the lower zones 22 in a different manner, shown at 28. Seismic energy is reflected from the one or more acoustic impedance boundaries 24 in the subsurface, and travels upwardly, shown at 30, where it is detected by the seismic sensors 16.

The seismic sensors 16 in the present example may be particle motion sensors such as geophones, accelerometers or any other type of sensor responsive to motion imparted thereto. For marine and/or transition zone seismic surveying, the seismic sensors 16 may be hydrophones or similar pressure or pressure gradient sensor, or a combination of such pressure or pressure gradient sensors and particle motion sensors. Particle motion sensors may be sensitive along one or more different directions. Accordingly, the type of seismic sensor is not a limit on the scope of this invention.

In the present example, the acoustic radiators may be devices such as piezoelectric radiators, magnetostrictive radiators, or any other device capable of generating high frequency vibrations. Generally, for purposes of the invention, the acoustic radiators 12, 14 may be any device that converts an electrical drive signal directly into acoustic or seismic energy coupled to the Earth (or the water or water bottom in marine surveying). Such acoustic radiators are thus different from seismic vibrators known in the art that use an electrical control signal to operate an hydraulic valve, wherein the hydraulic valve controls application of hydraulic pressure to a ram to move the radiating surface. In the present example, a frequency at which the acoustic radiators are operated may be above a "base" or "mean" frequency at which the non-linear zone 20 responds in non-linear manner to application of elastic energy. Thus the selected operating frequency may depend on the elastic properties of the non-linear zone, however practical implementations of an acoustic radiator may have a base or mean operating frequency near or above 10 KHz.

The acoustic radiators 12, 14 are, in one implementation, located close enough to each other so that the acoustic energy propagating below the non-linear zone 20, as shown at 28, radiates in a substantially spherical pattern, such that ordinary seismic exploration techniques for location of the seismic sensors 16 and subsequent data processing may be used. In another implementation, the acoustic radiators may be positioned to create a directed or focused pattern of energy into the subsurface.

In the present example, a first one of the acoustic radiators, shown for example at 12, operates at a first base frequency. A second one of the acoustic radiators, shown for example at 14, operates at a second base frequency. Propagation of acoustic energy at such base frequencies in the first manner, shown at 26, takes place in the non-linear zone 20. A difference between the base frequency of the first acoustic radiator 12 and that of the second acoustic radiator 14 will result in a superheterodyne frequency of acoustic energy that propagates through the zones 22 below the non-linear zone 20. In the present example, the first base frequency and the second base frequency are selected such that the difference therebetween is within a range of frequencies that seismic energy can be expected to propagate through the Earth's subsurface and be detected by the seismic sensors. One example of such a range is about zero to 200 Hz. The foregoing range of frequencies is provided as an example of a typical range of frequencies of interest in seismic exploration but does not represent a limitation on the range of frequencies that could be generated using the methods and devices described herein. The superheterodyne frequency may be produced by sweeping either or both the first and second base frequencies within a selected range. One example of such a swept range is for the first frequency to be swept through a range of 9900 to 10100 Hz, while the second frequency may be swept through the inverse range of 10100 Hz to 9900 Hz. The superheterodyne frequency in such example will then sweep through a range of 200 Hz to zero and back to 200 Hz. Another example of a swept range is for the first frequency to be held at a constant 10000 Hz while the second frequency sweeps through a range of 10000 Hz to 10200 Hz. The superheterodyne frequency in such example will then sweep through a range of zero to 200 Hz.

Because of the relatively small mass of acoustic radiators selected to operate at such frequencies as described herein, it is possible to provide very precise control over the acoustic wavefield generated by each acoustic radiator 12, 14. Thus, the frequency, phase and amplitude of the superheterodyne frequency acoustic energy (e.g., shown at 28 in FIG. 1, may also be precisely controlled.

Figure 2:
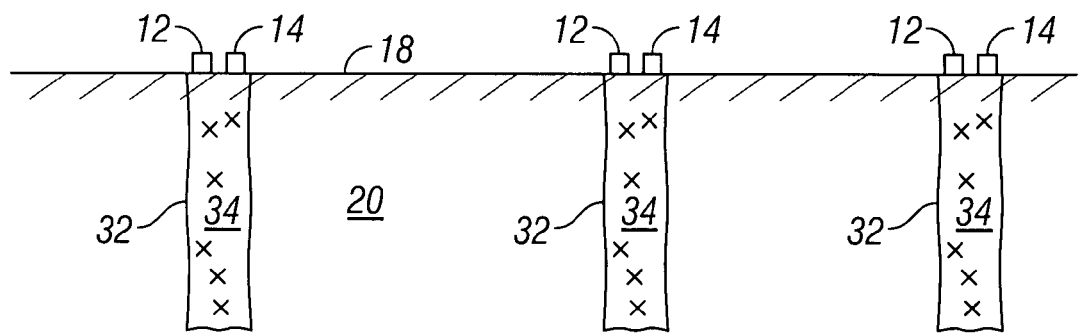
FIG. 2 shows an example of a device for improving acoustic coupling between acoustic radiators and the Earth's subsurface.

In some examples, acoustic coupling between the acoustic radiators and unconsolidated materials near the Earth's surface, known as the "weathered layer" may be improved as will be explained with reference to FIG. 2. One or more boreholes 32 may be made into the non-linear zone 20 or weathered layer proximate the Earth's surface 18. A material that is substantially harder and more consolidated, shown generally at 34, may be inserted into such boreholes 32. The material 34 may be, for example, concrete. The acoustic radiators 12, 14 may be affixed to or near the top of the material 34 in each of the boreholes 32. When the acoustic radiators 12, 14 are operated as explained above, the material 34 will efficiently transfer acoustic energy from the radiators 12, 14 to the subsurface, e.g., the non-linear zone 20.

Operating the acoustic radiators 12, 14 as explained above may eliminate the need to begin and end seismic "sweeps" with an amplitude taper, as is commonly performed using seismic vibrators known in the art. Using relatively high frequencies for the base frequency, as set forth in the above examples, may enable using relatively small reactive mass to couple the acoustic radiators to the ground surface or water bottom. By having smaller necessary reactive mass, it may be possible to substantially reduce the size, weight and cost of vehicles required to transport and operate a seismic energy source. This can result in improved accessibility of the seismic source to areas inaccessible to seismic source equipment known in the art. Further, such smaller vehicles would have a smaller environmental impact in the areas of operation. Finally, it is possible using a method and source according to the invention to obtain seismic frequencies close to zero, thus improving the bandwidth of imparted seismic energy and the resulting seismic images of the Earth's subsurface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic energy source, comprising:
    at least a first and a second acoustic radiator operatively coupled to a non-linear medium proximate an upper limit of formations in the Earth's subsurface, the first and second acoustic radiators configured to convert electrical energy directly into acoustic energy and to have a base or mean operating frequency near or above 10 Khz; and means for operating the first and the second acoustic radiator at respective first and second frequencies, the first and second frequencies selected near or above 10 Khz and such that substantially no acoustic energy propagates through the non-linear medium, the first and the second frequencies selected such that a difference there between is swept through a range of frequencies of seismic energy capable of propagating through the Earth's subsurface to at least one acoustic impedance boundary within the Earth's subsurface.

2. The source of claim 1 wherein the first and second acoustic radiators comprise piezoelectric devices.

3. The source of claim 1 wherein the first and second acoustic radiators comprise magnetostrictive devices.

4. The source of claim 1 wherein the means for operating is configured to operate the first and second acoustic radiators at about 10 KHz, and a difference between the first and second frequencies is within a range of about zero to 200 Hz.

5. The source of claim 1 further comprising at least one borehole formed through a weathered layer proximate the Earth's surface and filled with a material harder than material of the weathered layer, and wherein the first and second acoustic radiators are placed in contact with the material in the at least one borehole.

6. A method for subsurface surveying, comprising:
operating a first acoustic radiator disposed proximate the upper limit of the Earth's subsurface at a first frequency; and
operating a second acoustic radiator proximate the upper limit of the Earth's subsurface and the first acoustic radiator at a second frequency;
wherein the first and second frequencies are at least about 10 KHz and above a propagation frequency of a non-linear medium proximate the upper limit, and wherein a difference between the first and second frequencies is swept through a range of frequencies capable of propagating seismic energy through the Earth's subsurface to at least one acoustic impedance boundary therein.

7. The method of claim 6 wherein the first and second frequencies are selected such that difference there between is swept through a range of about zero to 200 Hz.

8. The source of claim 1 wherein said range of frequencies is provided by sweeping either or both the first and second frequencies of the first and second acoustic radiators through a range.

9. The source of claim 1 wherein said swept range is the difference of the first frequency being swept through a selected range while the second frequency is swept through the inverse of the selected range.

10. The source of claim 1 wherein the swept range is the difference of the first frequency being held constant while the second frequency is swept through a selected range.

11. The source of claim 9 wherein the first frequency is swept through a range of 9900 to 10100 Hz while the second frequency is swept through the inverse range of 10100 Hz to 9900 Hz, and the superheterodyne frequency is a sweep through a range of 200 Hz to 0 and back to 200 Hz.

12. The source of claim 10 wherein the first frequency is held at a constant 10000 Hz while the second frequency sweeps through a range of 10000 Hz to 10200 Hz, and the superheterodyne frequency sweeps through a range of 0 to 200 Hz.

13. The method of claim 6 wherein the first acoustic radiator and the second acoustic radiator are located in sufficiently close proximity such that the acoustic energy radiates in a substantially spherical pattern.

14. The method of claim 6 wherein the first acoustic radiator and the second acoustic radiator are positioned one with respect to the other such that the acoustic energy radiates in a directed pattern.

15. The method of claim 6 wherein the first and second acoustic radiators are positioned in first and second boreholes, formed through a weathered layer proximate the Earth's surface, that have been filled with a material harder than material of the weathered layer, and wherein the acoustic radiators are placed in contact with said harder material in the boreholes, for transmission of acoustic energy into the Earth's subsurface.

16. The method of claim 15 wherein the acoustic radiators are affixed to the top of the harder material in the boreholes.

17. The method of claim 15 wherein the harder material is concrete.

18. The method of claim 15 wherein the weathered layer is comprised of unconsolidated materials.

19. The method of claim 6 wherein the surveying is on land.

20. The method of claim 6 wherein the surveying is on water or on the water bottom.

* * * * *